United States Patent
McClanahan

(10) Patent No.: US 9,135,888 B2
(45) Date of Patent: Sep. 15, 2015

(54) SYSTEM AND METHOD FOR CONVERTING AN IMAGE TO AN INTENSITY BASED COLORMAP

(71) Applicant: L-3 Communications Cincinnati Electronics Corporation, Mason, OH (US)

(72) Inventor: Stephen McClanahan, Mason, OH (US)

(73) Assignee: L-3 Communications Cincinnati Electronics Corporation, Mason, OH (US)

( * ) Notice: Subject to any disclaimer, the term of this patent is extended or adjusted under 35 U.S.C. 154(b) by 251 days.

(21) Appl. No.: 13/833,146

(22) Filed: Mar. 15, 2013

(65) Prior Publication Data

US 2014/0267361 A1 Sep. 18, 2014

(51) Int. Cl.
| | |
|---|---|
| G09G 5/00 | (2006.01) |
| G09G 5/02 | (2006.01) |
| G09G 5/10 | (2006.01) |
| H04N 5/33 | (2006.01) |
| H04N 5/202 | (2006.01) |
| H04N 5/225 | (2006.01) |
| H04N 5/46 | (2006.01) |
| H04N 5/57 | (2006.01) |
| G03F 3/08 | (2006.01) |
| H04N 1/46 | (2006.01) |
| G06K 9/00 | (2006.01) |
| G06K 9/40 | (2006.01) |
| G06K 9/36 | (2006.01) |
| G06K 9/32 | (2006.01) |
| G06T 11/60 | (2006.01) |

(52) U.S. Cl.
CPC .. G09G 5/02 (2013.01); H04N 5/33 (2013.01); G06T 11/60 (2013.01)

(58) Field of Classification Search
USPC ........ 345/418, 581, 589–590, 591, 593–594, 345/600–601, 606, 619, 549, 690–691; 348/207.1, 254, 256, 552, 557, 603, 348/649, 671, 686–687, 162, 164, 174, 348/179; 358/518–519, 520, 523, 525, 537, 358/445, 448, 452; 382/162, 166–167, 254, 382/274, 276, 298–300
See application file for complete search history.

(56) References Cited

U.S. PATENT DOCUMENTS 3,719,127 A    3/1973   Mueller
4,808,988 A * 2/1989   Burke et al. .................... 345/16
(Continued)

FOREIGN PATENT DOCUMENTS

WO     WO0239724 A1    5/2002

OTHER PUBLICATIONS

David Borland, et al, Rainbow Color Map (Still) Considered Harmful; Visualization Viewpoints, Published by the IEEE Computer Society, Mar./Apr. 2007.

(Continued)

*Primary Examiner* — Wesner Sajous
(74) *Attorney, Agent, or Firm* — Dinsmore & Shohl LLP

(57) ABSTRACT

The systems and methods described herein disclose creating an Intensity Based Colormap by interweaving different Hues between two end points (e.g., black and white) with increasing Luminance. An Intensity Based Colormap may be used to convert Computer Input image data using a Computer Machine encoded with an Intensity Based Colormap.

17 Claims, 5 Drawing Sheets
(3 of 5 Drawing Sheet(s) Filed in Color)

```
CODE EXAMPLE #1

PROGRAM IntensityColorMap    \\ The specific code may be depending on the RGB
                             \\ model utilized (e.g., HSL, HSI, HSV, or other)

Method SetColorMap (Hue1, Hue2, Hue3, Return: ColorMap)
{
    Luminance = 0;  \\When Luminance is set to 0, the band will appear black
    Saturation = 30;
    MaxCount = 384

Color1 = (Hue1, Saturation, Luminance);
    Color2 = (Hue2, Saturation, Luminance);
    Color3 = (Hue3, Saturation, Luminance);

Loop Until ColorMap.Count = MaxCount;
    {
        ColorMap.Add (Color1);    // This function both increases the count and
        ColorMap.Add (Color2);    // adds a new band of Color to the Colormap
        ColorMap.Add (Color3);
        \\
        Color1.increaseLuminance;
        Color2.increaseLuminance;
        Color3.increaseLuminance;
    }

ColorMap.Add (Color1);    // This function both increases the count and adds a new
    ColorMap.Add (Color2);    // band of Color to the Colormap
    ColorMap.Add (Color3);

Return ColorMap;
}
```

(56) References Cited

U.S. PATENT DOCUMENTS

| | | | |
|---|---|---|---|
| 5,093,717 A | 3/1992 | Sandrew | |
| 6,337,692 B1* | 1/2002 | Rai et al. | 345/594 |
| 7,391,901 B2 | 6/2008 | de Queiroz et al. | |
| 7,518,584 B2 | 4/2009 | Heynderickx et al. | |
| 7,675,648 B2 | 3/2010 | Ernst et al. | |
| 8,077,353 B2 | 12/2011 | Wada | |
| 8,086,030 B2 | 12/2011 | Gordon et al. | |
| 8,089,482 B1 | 1/2012 | Axelrod | |
| 8,755,597 B1* | 6/2014 | Tantalo et al. | 382/162 |
| 2002/0136447 A1 | 9/2002 | Link et al. | |
| 2003/0044062 A1 | 3/2003 | Ganapathy et al. | |
| 2006/0055945 A1 | 3/2006 | Fazakerly | |
| 2008/0062193 A1* | 3/2008 | Olson | 345/591 |
| 2009/0096807 A1 | 4/2009 | Silverstein et al. | |
| 2010/0128049 A1 | 5/2010 | Georgiev et al. | |
| 2010/0238165 A1 | 9/2010 | Watkins et al. | |
| 2011/0158515 A1* | 6/2011 | Chuang et al. | 382/163 |
| 2012/0019548 A1 | 1/2012 | Zhu et al. | |
| 2014/0240512 A1* | 8/2014 | Hogasten et al. | 348/164 |

OTHER PUBLICATIONS

International Search Report issued in corresponding PCT application PCT/US2014/027547, mailed Jan. 8, 2015.

Vieira et al, Fully Automatic Coloring of Grayscale Images, Image and Vision Computing 25, pp. 50-60 (2007).

Lissner et al, Image-Difference Prediction: From Grayscale to Color, IEEE Transactions on Image Processing, 22:2, pp. 435-446 (Feb. 2013).

Jacob et al, Colorization of Grayscale Images and Videos Using a Semi-Automatic Approach, IEEE International Conference, pp. 1653-1656 (Nov. 2009).

* cited by examiner

CODE EXAMPLE #1

PROGRAM IntensityColorMap     \\ The specific code may be depending on the RGB
                              \\ model utilized (e.g., HSL, HSI, HSV, or other)

Method SetColorMap (Hue1, Hue2, Hue3, Return: ColorMap)
{
    Luminance = 0;   \\When Luminance is set to 0, the band will appear black
    Saturation = 30;
    MaxCount = 384

Color1 = (Hue1, Saturation, Luminance);
    Color2 = (Hue2, Saturation, Luminance);
    Color3 = (Hue3, Saturation, Luminance);

Loop Until ColorMap.Count = MaxCount;
    {
        ColorMap.Add (Color1);     // This function both increases the count and
        ColorMap.Add (Color2);     // adds a new band of Color to the Colormap
        ColorMap.Add (Color3);
        \\
        Color1.increaseLuminance;
        Color2.increaseLuminance;
        Color3.increaseLuminance;
    }

ColorMap.Add (Color1);   // This function both increases the count and adds a new
    ColorMap.Add (Color2);   // band of Color to the Colormap
    ColorMap.Add (Color3);

Return ColorMap;
}

FIG. 5

CODE EXAMPLE #2

```
// 384 levels between black (0) and white (255) -- this represents 128 cycles of three Colors for (int i = 0; I <= 383; i++)
{
        Int Hue = i%3                      //Hue remainder of i/3 = 0, 1, or 2
        Int ColorHue;

Switch Hue
        {
                Case 0:
                        ColorHue = 100;    //Set Hue to 100 on the RGB scale
                Case 1:
                        ColorHue = 120;    //Set Hue to 120 on the RGB scale
                Case 2:
                        ColorHue = 140;    //Set Hue to 140 on the RGB scale
        }

Int Saturation = 30                //Saturation remains constant
        Int Brightness = i/3 * 2;          //Brightness changes every 3 iterations
                                           //at i = 384 (the end of the for loop), brightness
                                           //will be 128 * 2 or 256 which equals white
}
```

FIG. 6

SYSTEM AND METHOD FOR CONVERTING AN IMAGE TO AN INTENSITY BASED COLORMAP

BACKGROUND

1. Field

The present specification generally relates to conversion of grayscale to Color using an Intensity Based Colormap.

2. Technical Background

A grayscale image typically comprises 256 shades of gray (Hue=0), see FIG. 1, starting at black and increasing in Luminance to white.

Infrared thermography (IRT) and other forms of thermal imaging detect radiation in the infrared range of the electromagnetic spectrum and produce images of that radiation called thermograms. Since infrared radiation is emitted by all objects above absolute zero according to black body radiation law, thermography makes it possible to see one's environment with or without visible illumination. When viewed through a thermal imaging camera, warm objects stand out well against cooler backgrounds. For example, humans and other warm-blooded animals become easily visible against the environment, day or night. As a result, thermography is particularly useful to military and other users of surveillance cameras.

The use of grayscale colormaps to delineate such data is ubiquitous. However, referring to FIG. 2, traditional colormapping which utilizes Hued maps of a single or variety of Colors fail because they lack either the differentiation necessary for human perception or assign a false Color to a pixel. In the latter case, the lack of perceptual ordering, associated with grayscale mapping, is discussed in *Rainbow Colormap (Still) Considered Harmful* (David Borland and Russell M. Taylor II—IEEE Computer Society—March/April 2007):

> For all tasks that involve comparing relative values, the colormap should exhibit perceptual ordering . . . increasing Luminance from black to white is a strong perceptual cue that indicates values mapped to darker shades of gray are lower in value than values mapped to lighter shades of gray . . . . The rainbow colormap is certainly ordered—from a shorter to longer wavelength of light but it is not perceptually ordered . . . confusion results because greater-than and less-than relationships are not immediately evident and we must infer them through remembering (an error-prone task) or consulting a legend (a needless distraction for determining order).

This quote identifies a problem in the industry. For instance, referring again to FIG. 2, a false Color spectrum (e.g., Jet) is colorful and has high contrast but it is not intuitive as blue represents the low end, red represents the high end. The Jet system sacrifices realism for high contrast.

Even a tailored false Color overlay on a grayscale image (e.g., colorizing specific hot spots above a certain temperature bar) does not meaningfully convey gradations in data to the end-user.

Traditional grayscale maps, however, also have inherent limitations even though the perceptual ordering of the grayscale colormap (with its increasing Luminance from black to white) lends well to the display of intensity-based imagery.

Referring again to FIG. 1, there are 256 levels of gray in the grayscale colormap. The downside to the grayscale colormap, however, is that the human eye can only see about one hundred different shades of a given Color (the same applies to a pink, bone, copper or other mono-hued colormaps). In general, black represents the low end of the spectrum and white represents the high end. The values in between are intuitively determined in accordance with their observed Luminance. But, the human eye cannot discern as much variety in the grayscale image as there actually is within the data. Thus, over half of the grayscale Colormap is useless when used for human inspection. Grayscale images (black-gray-white) have intensity (since the Hue/Saturation are the same=0). Color, however, offers greater opportunities for communicating data since it usually involves three dimensions: Hue, Saturation, and Luminance.

Therefore, there is a need in the art to show both more detail and gradation in the data to a human viewer by converting an image with an alternate, perceptually ordered colormap.

SUMMARY

Aspects and embodiments of the systems comprise varying depth and breadth in their functionality.

In an aspect, there may be a method for constructing a colormap on a Computer Machine; receiving an image from a thermal camera; rendering the image on a Computer Machine using the colormap; and generating, for Graphical Display on a Graphical User Interface, the image rendered by the colormap. There may be some variance in the order of the steps disclosed. Constructing a colormap on a Computer Machine may further include receiving a set of Hues; setting a Saturation level to a constant value; and setting a Luminance level to zero or other starting value. The Computer Machine may Calculate a set of Colors, for the colormap, using the Saturation level and the Luminance level with each of the Hues from the set of Hues. The Computer Machine may then assign this set of Colors to an Intensity-Based Colormap. A Computer Machine may increase the Luminance level and then calculate a next set of Colors by combining the constant Saturation level and the new Luminance level with each of the Hues from the set of Hues and assign those Colors to the colormap. This step may be repeated by "increasing the Luminance level" step, "calculating a next set of Colors" step, and "assigning the next set of Colors" step until a predefined width for said colormap is reached;

In embodiments disclosed herein the set of Hues comprises three Hues. The set of Hues may be within the same Color family. In an example of Hues within the same Color family, the set of Hues may be green (first), blue (second) and purple (third). An Exemplary colormap may utilize the following pattern:

Darkest Color1→Darkest Color2→Darkest Color3
   Lighter Color1→Lighter Color2→Lighter Color3 (repeat)
Lightest Color1→Lightest Color2→Lightest Color3

In the above example, a black segment(s) may be achieved by setting a Luminance value associated with each of said darkest Colors to zero. Additionally, a white segment(s) may be achieved by setting a Luminance value of a Color to 256. The Saturation level may be kept constant for each segment of the colormap. The Luminance value, however, increases with each cycle/repetition of the group of Hues until white is reached. In an embodiment, a colormap may begin with a black segment and end with a white segment. In an embodiment, a black segment has a Luminance value of 0 and said white segment has a Luminance value of 255.

In embodiments disclosed herein, "rendering the image on a Computer Machine using the colormap" further comprises scaling a set of datapoints from the image received from a thermal camera to create a grayscale image using a grayscale-colormap; mapping said grayscale-colormap to the calculated colormap to create a lookup table comprising a relationship between each grayscale datapoint and each colormap datapoint; determining which Colormap value is associated with each pixel in said grayscale image; and converting each grayscale image pixel to its associated colormap value to create a colormap image.

Embodiments disclosed herein may utilize anywhere from 2-5 Hues.

In another aspect, there may be a computer system, utilizing one or more Computer Machines or Servers for converting images using an Intensity Based Colormap, comprising means for Automatically receiving a set of infrared image data; means for Calculating and setting an Intensity Based Colormap with interwoven Colors; means for Automatically rendering an infrared image using said Intensity Based Colormap; and means for Automatically outputting an intensity-based image created by using said Intensity Based Colormap.

Embodiments disclosed herein may have "means for Calculating and setting an Intensity Based Colormap with interwoven Colors". These means include a programmatic construct encoded on a non-transitory computer readable medium wherein the programmatic construct interweaves a set of three Hues at a constant level of Saturation and an increasing level of Luminance for a predetermined number of cycles until each segment in the Intensity Based Colormap has been set. The Intensity Based Colormap may be stored for later use on a non-transitory computer-readable medium.

In embodiments disclosed herein, 128 may be the default number of levels for an Intensity Based Colormap. A user may override the default number to customize their Intensity Based Colormap as desired.

In embodiments disclosed herein, a Color family may be assigned to a specific type of image. In one example a set of three Hues comprising a red value, an orange value, and a yellow value may be used for the infrared image when such is a desert image.

In embodiments disclosed herein, the system receives a number of cycles, a number of Hues, and a degree of separation between the number of Hues from a user.

In another aspect, there may be a non-transitory computer readable medium encoded with computer-readable instructions for execution by a Computer Machine to convert an image file using an Intensity Based Colormap. These computer-readable instructions, when executed, may cause the Computer Machine to receive an image; configure an Intensity Based Colormap with interwoven Colors; render the image using said Intensity Based Colormap; and output an intensity-based image on a Graphical User Interface. Non-limiting examples of pseudocode for such computer readable instructions may be found in FIGS. 5 and 6.

Embodiments disclosed herein may configure an Intensity Based Colormap with interwoven Colors by setting a first Hue to 100 on an RGB scale; setting a second Hue to 120 on an RGB scale; setting a third Hue to 140 on an RGB scale; setting a Saturation level to a constant value (e.g., 30); and setting a Luminance level to zero. Such embodiments calculate a first, second, and third Color using the first, second and third Hues, respectively, with said Saturation level and said Luminance level. Next, these embodiments place each of the first, second and third Colors on the colormap. For every three colors placed on the colormap, programmatic instructions cause the Luminance level to be increased. The calculating/placing/increasing steps are repeated until the Luminance level results in a white value or other user-defined ending value.

Embodiments disclosed herein may render the image using the Intensity Based Colormap by mapping a set of image data received from an infrared camera to a grayscale palette and then converting a grayscale image to the Intensity Based Colormap.

Embodiments disclosed herein may render said image using the Intensity Based Colormap by directly mapping a set of image data received from an infrared camera to the Intensity Based Colormap.

Embodiments disclosed herein may configure an Intensity Based Colormap with interwoven Colors by creating a colormap ranging from black to white comprising multiple cycles of three Hues with constant Saturation and steadily increasing Luminance.

BRIEF DESCRIPTION OF THE DRAWINGS

The patent or application file contains at least one drawing executed in Color. Copies of this patent or patent application publication with Color drawing(s) will be provided by the Office upon request and payment of the necessary fee. The embodiments set forth in the drawings are illustrative and Exemplary in nature and not intended to limit the subject matter defined by the claims. The following detailed description of the illustrative aspects and embodiments can be understood when read in conjunction with the following drawings, where like structure is indicated with like reference numerals and in which:

FIG. 5 represents an example of pseudocode.

FIG. 6 represents an example of pseudocode.

DETAILED DESCRIPTION

Figure 1:
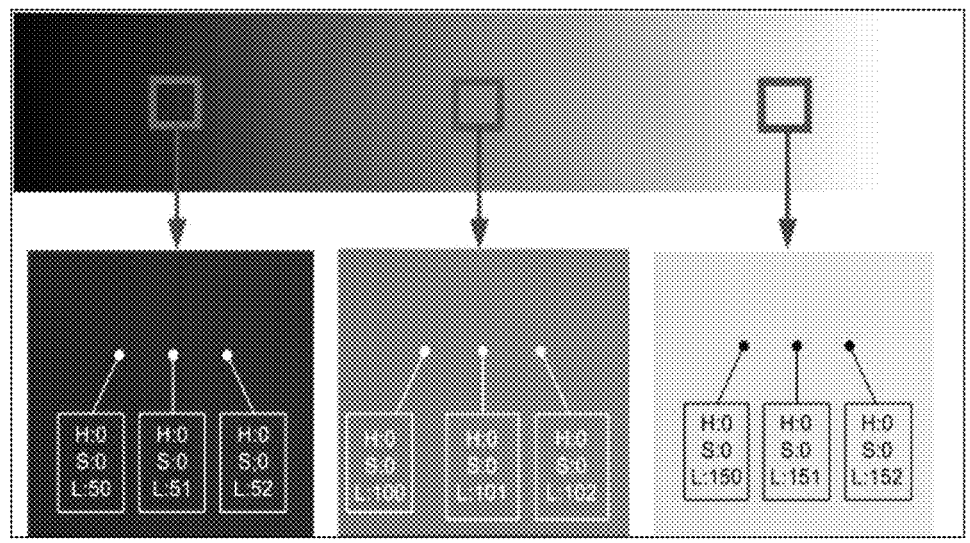
FIG. 1 depicts a traditional grayscale-colormap.
Figure 2:
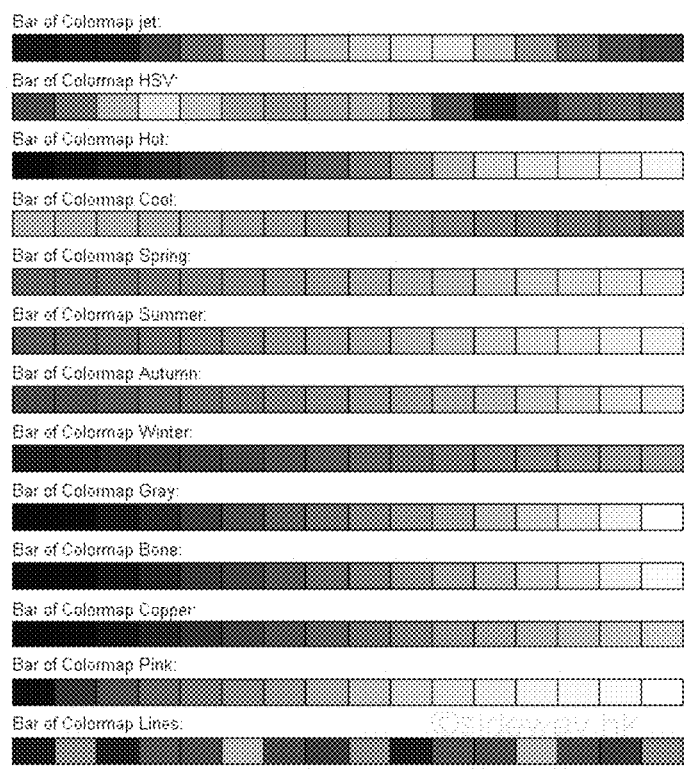
FIG. 2 depicts a sampling of traditional false colormaps.

The drawings, systems and methods described herein relate to the generation and usage of an Intensity Based Colormap for conversion of images using said system.

GENERAL DEFINITIONS

"Automatically" includes the use of a machine to conduct a particular action. The process by which data is extracted, organized and stored is a data-driven and largely automatic process and may utilize a computer network (e.g., wide area network, such as the internet, a local area network, a mobile communications network, a public service telephone network, and/or any other network and may be configured to electronically connect a user computing device (e.g., a PC) and a Server computing device (e.g., cloud, mainframe, or other Server device).

"Calculate" includes Automatically determining or ascertaining a result or Computer Machine Output using Computer Machine Input.

"Computer Machine" includes a machine (e.g., desktop, laptop, tablet, smartphone, television, Server, as well as other current or future Computer Machine instantiations) containing a computer Processor that has been specially configured with a set of computer executable instructions. References to "at least one" Computer Machine are intended to encompass both autonomous systems and sub-systems as well as situations where a given functionality might be divided across multiple machines (e.g. parallel processing) for efficiency or other purposes.

"Computer Machine Input/Output" includes input/output received/produced by a Computer Machine.

"Exemplary" as used herein means giving an example; serving as an illustration or example of something.

"Generate for Graphical Display" includes to Automatically create, using Computer Machine Input, an object(s) to be displayed on a GUI (e.g., an image, a data entry screen, a drop-down menu, etc.).

"GUI" or "Graphical User Interface" includes a user interface displayed on a visual subsystem (e.g., desktop monitor, tablet/phone screen, interactive television screen, etc.) by which users interact with electronic devices via images (e.g., icons, lists, hyperlinks, panels, etc.).

A "Processor" may include any processing component configured to receive and execute instructions (such as from the data storage component and/or memory component). Network interface hardware may include any wired/wireless hardware generally known to those of skill in the art for communicating with other networks and/or devices.

A "Server" may be customized Computer Machine or a general purpose Computer Machine with the requisite hardware, software, and/or firmware. A Server may include a Processor, input/output hardware, network interface hardware, a data storage component (which stores data and/or metadata) and a memory component configured as volatile or non-volatile memory including RAM (e.g., SRAM, DRAM, and/or other types of random access memory), flash memory, registers, compact discs (CDs), digital versatile discs (DVD), and/or other types of storage components. A memory component may also include operating logic that, when executed, facilitates the operations described herein. An administrative computing device may also be employed to facilitate manual corrections to the metadata.

COLOR DEFINITIONS

"Color" refers to a value derived from a combination of Hue, Saturation and Luminance (HSL). Various models of Color exist and may affect calculations disclosed herein (e.g., HSI and HSV where I stands for Intensity and V stands for Value). If a different Color model is employed, it should be within the skill of the art to adjust the calculations disclosed herein accordingly (e.g., substituting changes in I (Intensity) or V (Value) for L (Luminance)).

"Hue" refers to one of the main properties of a color, defined technically (in the CIECAM02 model), as "the degree to which a stimulus can be described as similar to or different from stimuli that are described as red, green, blue, and yellow," (the unique hues). See, http://en.wikipedia.org/wiki/Hue#cite_note-1.

"Intensity Based Colormap" refers to a data structure for a Color palette, encoded on a non-transitory computer-readable medium, according to embodiments disclosed herein and equivalents thereof, wherein a set of Hues are interwoven with a constant level of Saturation and increasing levels of Luminance between two endpoints.

"Saturation" refers to a Color's strength or weakness—whether the Hue is in a pure state or more gray.

"Luminance" or "Value" or "Intensity" describes the amount of light that passes through or is emitted from a particular area, and falls within a given solid angle. It refers to the relative lightness or darkness of a Color. More Luminance results in Tints (more pastel) and less Luminance results in Shades (bolder Colors).

With these definitions established, the structure and operation of various embodiments of systems and methods for creating and applying various Intensity Based Colormaps are now described.

Colormap Generation

Figure 3:
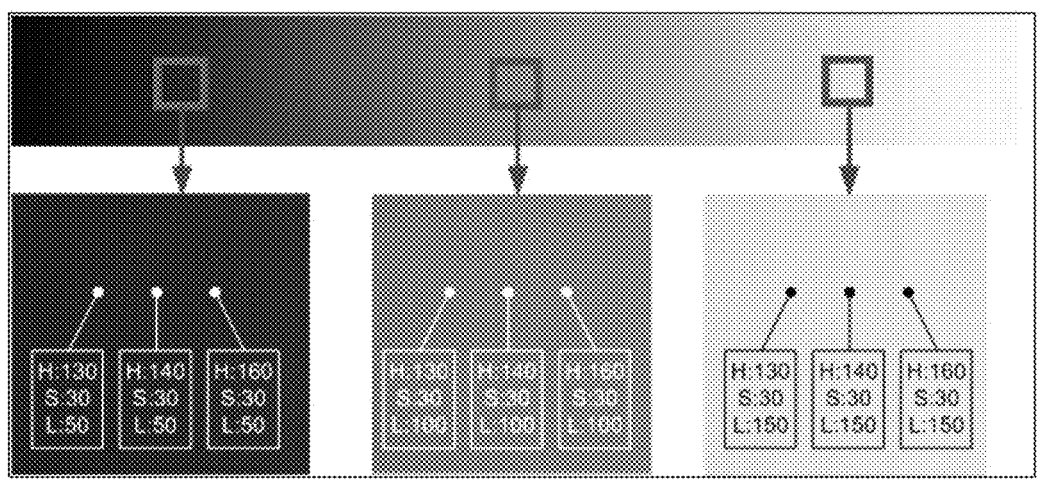
FIG. 3 represents an Exemplary Intensity Based Colormap utilizing green, blue, purple banded on either end by black and white, respectively.

Embodiments disclosed herein Calculate and Generate for Graphical Display an Intensity Based Colormap. Embodiments may start at black and increase to white (as in a traditional grayscale). In between black and white, embodiments may alternate Hues of varying Luminance to achieve an interwoven effect between these endpoints. Referring to FIG. 3, an Exemplary Intensity Based Colormap using three Hues (green—130, blue—140, purple—160) comprises multiple iterations according to the following pattern:

Black (from 1x to 3x) →
Dark green → Dark blue → Dark purple →
Lighter green → Lighter blue → Lighter purple
   Repeat with increasing Luminance and constant Saturation until desired band width achieved then
Lightest green → Lightest blue → Lightest purple →
White (from 1x to 3x)

Interweaving Hues with increasing Luminance maintains perceptual ordering of the grayscale-colormap, going from black to white. When Luminance is a low number (e.g., 50) the segments/levels appear more black. As Luminance increases (e.g., to 150), the segments/levels appear more white. One may select alternative endpoints than black and white, however, these provide a preferred range for perceptual ordering. Consequently, it is possible for a human to perceive more variation in a resultant image. In a preferred embodiment, a limited number of Hues produces higher contrast in a resulting image. Thus embodiments may utilize 2-5 Hues.

In another Exemplary embodiment, three Hues each with 128 levels of Luminance ranging from black to white may be used to Calculate the colormap. This embodiment provides 384 levels in the resulting colormap and also provides an even more dynamic range of data than the 256 levels of the grayscale-colormap. Each additional Hue added to the band may provide more ability to delineate contrast within a localized area, however, the number of Hues should be limited so that global contrast is not sacrificed in favor of localized differentiation. Embodiments disclosed herein may provide larger steps in Luminance between pattern repetitions to compensate for lower global contrast.

Embodiments disclosed herein may structure a Colormap using a specific Color family. Embodiments disclosed herein may utilize a ROYGBIV (red, orange, yellow, green, blue, indigo, violet) ordering scheme in choosing the Colors to be represented in the colormap. Embodiments disclosed herein may separate Hues by about 30 units (in a range of 0-255 in an RGB scale) to provide an appropriate level of contrast particularly for video rendition. A wider range of about 80 units in Hue difference may be chosen for use with still pictures but, in a video, a broad range of Hues may create a pulsating effect with local Color change that makes it difficult to compare images perceptually from one to the next. A tighter band of Hues produces a more consistent stream of images. Thus, a preferred range of contrast for video rendition may be about 30 units.

Embodiments disclosed herein may maintain the Saturation of a Color as a constant so that the variance in the map is achieved by altering one or more of the Hue or Luminance.

Embodiments disclosed herein allow users to choose specific Colors for interweaving to further emphasize other features of the resultant image. For instance, a desert image may be conveyed as follows:

---
Black (up to 3x) →
Dark red → Dark orange → Dark yellow →
Lighter red → Lighter orange → Lighter yellow
   Repeat until desired band width achieved
Lightest red → Lightest orange → Lightest yellow →
White (up to 3x)

---

Alternatively, a forest scene may be conveyed as:

---
Black (up to 3x) →
Dark yellow → Dark green → Dark blue →
Lighter yellow → Lighter green → Lighter blue
   Repeat until desired band width achieved
Lightest yellow → Lightest green → Lightest blue →
White (up to 3x)

---

Figures 4A, 4B, 4C, 4D:
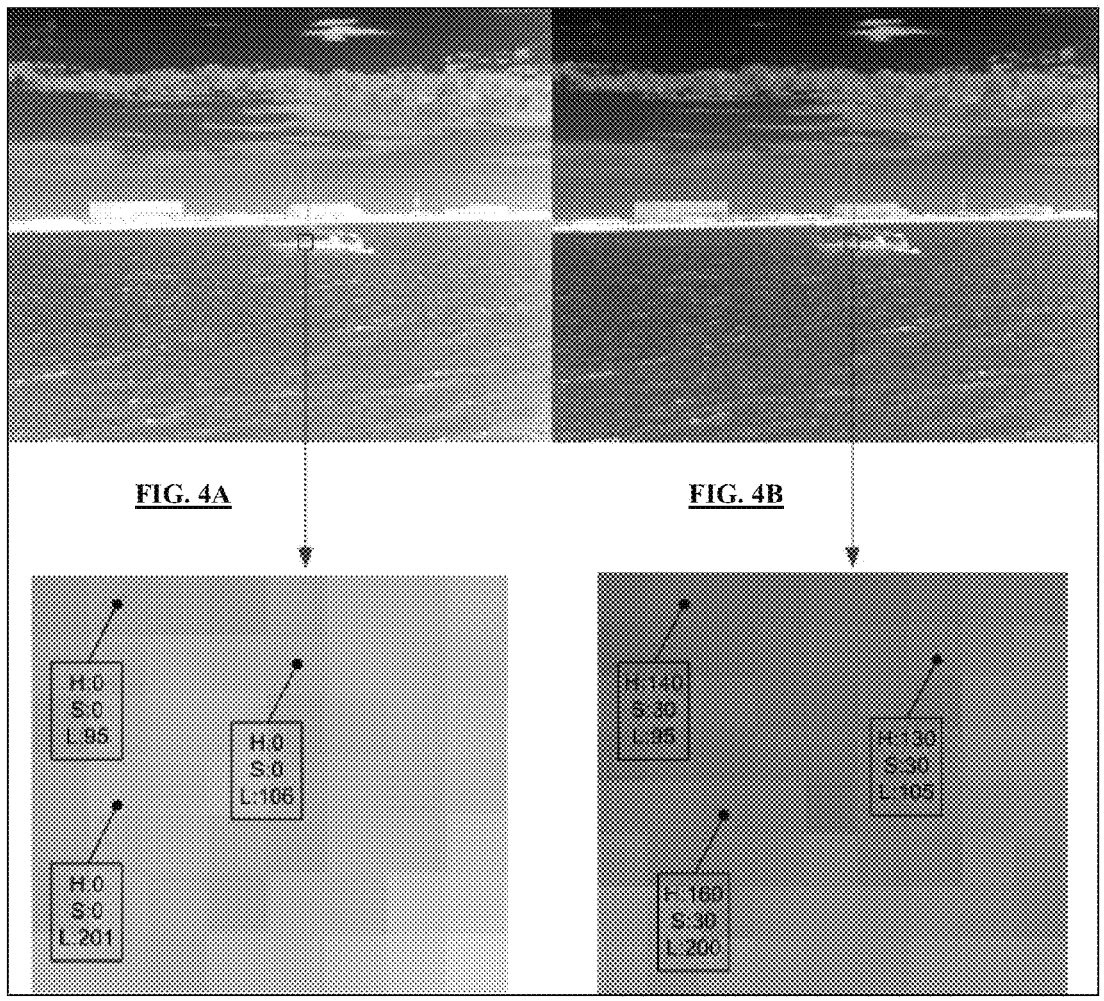
FIG. 4A represents an example of an image rendered in a traditional grayscale-colormap.
FIG. 4B represents an example of an image rendered with an Intensity Based Colormap utilizing green, blue, and purple.
FIG. 4C represents a map of several pixels within the image presented in FIG. 4A.
FIG. 4D represents a map of several pixels within the image presented in FIG. 4B.

Embodiments disclosed herein use an Intensity Based Colormap to depict an image. Referring to FIG. 4A, there is shown an image constructed from a traditional grayscale-colormap. Contrasting this to FIG. 4B, there is shown an Exemplary image utilizing an Intensity Based Colormap. The image in FIG. 4B permits human assimilation of the data using perceptual ordering to a greater degree than previous grayscale mapping systems without skewing the resultant image through false Colorization requiring additional translation and/or consultation with a legend to fully comprehend the significance of contrasting elements of the image. Referring to FIGS. 4C-4D, a section from each of the images presented in FIGS. 4A-4B is mapped. For the grayscale image, only the luminance value changes (Hue and Saturation are both set to a zero value). The image rendered in FIG. 4D, using an Intensity Based Color Map, sets pixels with a constant Saturation but with Hues 130, 140 and 160 along with variations in the Luminance value.

Applications of Intensity Based Colormaps

Intensity Based Colormaps may be employed to render results from infrared thermal imaging sensors and surveillance products. Infrared may have many levels (e.g., 65,000 levels). Infrared images lose data when displayed in grayscale because the data must be translated from 65,000 data points to a grayscale map of only 256 data points or even 100 data points (what is actually detectable by the human eye). Thus, the human eye is not able to appreciate the full depth of data provided by an infrared system.

Embodiments disclosed herein may Calculate a conversion from grayscale to Intensity Based Colormap through a variety of means ranging from an algorithm designed to utilize a table lookup for conversion to an algorithmic or programmatic solution.

Embodiments disclosed herein may utilize a lookup table. A Computer Input data feed from a thermal camera may have a great number of datapoints that need to be translated into a scaled colormap. Embodiments disclosed herein may translate Computer Input to a typical grayscale range of 0-255 according to methods known in the art (e.g., scaling or histograms).

A set of computer executable instructions on a computer readable medium may be executed on a Computer Machine to analyze an image pixel by pixel to read in the gray value and then assign a Hue and Luminance to that gray value. For instance, at grayscale index position 18, Hue equals C, Saturation is constant, and Luminance equals Y. The number of degrees of Luminance in an Intensity Based Colormap will depend on the size of the colormap.

| Gray | 0 | ... | 18 | ... | ... | 255 |
|---|---|---|---|---|---|---|
| Hue | A | B | C | A | B | C |
| Saturation | | | Constant | | | |
| Luminance | Y | Y | Y | Z | Z | Z |

Once all of the pixels have been translated using an Intensity Based Colormap translation lookup table, an image will be converted for display on a Graphical User Interface using an Intensity Based Colormap.

Other embodiments may translate an infrared image directly from the infrared Computer Input to an Intensity Based Colormap and Generate for Graphical Display a resultant image.

Referring to FIG. 5, in an alternative embodiment, a partial programmatic construct is shown that may be utilized to Calculate the conversion of a image to an Intensity Based Colormap image.

Referring to FIG. 6, in an alternative embodiment, a partial programmatic construct is shown that may be utilized to Calculate the conversion of a image to an Intensity Based Colormap image. As this and the previous example show, an endless variety of programmatic solutions may be possible to achieve embodiments of the present invention including, but not limited to, directly converting an infrared image to the Intensity Based Colormap image or engaging in an intermediate conversion to a grayscale image.

Embodiments disclosed herein provide a perception multiplier for grayscale—if a human could theoretically see 100 shades of gray, the interwoven Hues of an Intensity Based Colormap image will allow them to perceive at least 150 (or more) possible distinctions.

Embodiments disclosed herein may use about 128 cycles in its lightening pattern across the selected Hues. The more cycles, the larger the colormap and the less global contrast that may exist. Variations in the cycles may be dependent on the number of hues the color map supports. In general, it is preferred to maintain an overall colormap of around 384 different levels. Therefore, for a three hue Intensity Based Colormap, 128 (i.e., 384/3) cycles is preferred. Reducing the overall colormap levels from 384 levels may increase the overall contrast of the imagery, but may decrease the local variation supported within the color map.

Embodiments disclosed herein may allow customization by individual end users as to number of cycles, number of Hues, degrees of separation between Hues, etc. as each human may have differing abilities to perceive Colors as well as contrast. A preferred range may be individually configured.

Users can more accurately assess output from sensors and thermal imaging systems utilizing Intensity Based colormapping. Perceptual ordering permits greater situational awareness, enhances surveillance capabilities, and aids in the detection and deterrence of potential threats from military engagements to homeland security situations.

Embodiments disclosed herein may be employed in high-definition, wide-area, long-range surveillance sensors such as WALRSS produced by Cincinnati Electronics. Highly sensitive infrared cameras may produce many more times the number of pixels as a standard definition camera. Converting such images with the greatest possible detail for human consumption achieves more accurate and reliable human analysis. Additionally, Intensity Based colormapping allows end-users to take advantage of both the data feed possible from thermal/infrared cameras as well as viewing output on Color monitors when analyzing infrared imagery.

Technical Variations

According to the embodiments described herein, any of the systems, logic and devices can be implemented as machine readable instructions or an algorithm written in any programming language of any generation (e.g., 1 GL, 2 GL, 3 GL, 4 GL, or 5 GL) such as, e.g., machine language that may be directly executed by a Processor, or assembly language, object-oriented programming (OOP), scripting languages, microcode, etc., that may be compiled or assembled into machine readable instructions and stored on a machine readable medium contained in a Computer Machine. Alternatively, the logic or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components.

Moreover, embodiments of the present disclosure may include one or more processors. As used herein, Processor means any device capable of executing machine readable instructions. Accordingly, each Processor may be a controller, an integrated circuit, a microchip, a computer, or any other computing device. The memory described herein may be RAM, ROM, a flash memory, a hard drive, or any device capable of storing machine readable instructions.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. The diagrams and representations of output Generated for Graphical Display are all provided for Exemplary purposes. The illustrative diagrams and charts may depict process steps or blocks that may represent modules, segments, or portions of code that include one or more executable instructions for implementing specific logical functions or steps in the process upon a Computer Machine. In various embodiments, described processing steps may be performed in varying order, serially or in parallel. Alternative implementations are possible and may be made by simple design choice or based on, for example, considerations of function, purpose, conformance to standard, legacy structure, user interface design, and the like. Additionally, execution of some functionality, which would be considered within the ambit of one skilled in the art, may or may not be disclosed herein. Finally, variances may be omitted without departing from embodiments disclosed herein.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer Processor executing a program embodied on a non-transitory computer-readable medium to perform functions by operating on Computer Input and generating Computer Output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single Processor or multiple Processors. Additionally, various steps of embodiments may provide one or more data structures generated, produced, received, or otherwise implemented on a computer-readable medium, such as a memory. These capabilities may be performed in the current manner or in a distributed manner and on, or via, any device able to provide and/or receive information. Still further, although depicted in a particular manner, a greater or lesser number of modules and connections can be utilized with the present disclosure in order to implement or perform the various embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method comprising:
constructing a colormap on a Computer Machine comprising the steps of:
receiving a set of Hues;
setting a Saturation level to a constant value;
setting a Luminance level to zero;
calculating a set of Colors by combining said Saturation level and said Luminance level with each of said Hues from said set of Hues;
assigning said set of Colors to an Intensity Based Colormap;
increasing said Luminance level;
calculating a next set of Colors by combining said Saturation level and said Luminance level with each of said Hues from said set of Hues;
assigning said next set of Colors to said Colormap; and
repeating said increasing said Luminance level step and said calculating a next set of Colors step and said assigning said next set of Colors step until a predefined width for said Colormap is reached;
receiving an image from a thermal camera;
rendering said image on a Computer Machine using said Colormap; and
Generating for Graphical Display on a Graphical User Interface said image rendered by said Colormap.

2. A method as claimed in claim 1 wherein said set of Hues comprises three Hues.

3. A method as claimed in claim 2 wherein said set of Hues are within a Color family.

4. A method as claimed in claim 3 wherein a first Hue in said set of Hues is green, a second Hue in said set of Hues is blue, and a third Hue in said set of Hues is purple.

5. A method as claimed in claim 3 wherein said Colormap comprises a pattern such as:
Darkest Color1→Darkest Color2→Darkest Color3
  Lighter Color1→Lighter Color2→Lighter Color3 (repeat)
Lightest Color1→Lightest Color2→Lightest Color3
  wherein a Luminance value associated with each of said darkest Colors is set to zero; and wherein said Luminance value associated with each of said lightest Colors is set to 256; and wherein a Saturation level for said Intensity Based Colormap is a constant; and wherein said Luminance value increases on each repetition until a white segment is reached.

6. A method as claimed in claim 5 wherein said "rendering said image on a Computer Machine using said Colormap" further comprises:

scaling a set of datapoints from said image, received from said thermal camera, to create a grayscale image using a grayscale-colormap;

mapping said grayscale-colormap to said Colormap to create a lookup table comprising a relationship between each grayscale datapoint and each Colormap datapoint;

determining which Colormap value is associated with each pixel in said grayscale image; and converting each grayscale image pixel to its associated Colormap value to create a Colormap image.

7. A method as claimed in claim 1 wherein said Colormap begins with a black segment and ends with a white segment.

8. A method as claimed in claim 7 wherein said black segment has a Luminance value of 0 and said white segment has a Luminance value of 255.

9. A method as claimed in claim 1 wherein said set of Hues comprises two-five Hues.

10. A computer system, utilizing one or more Computer Machines for converting images using an Intensity Based Colormap, comprising:

means for Automatically receiving a set of infrared image data;

a programmatic construct encoded on a non-transitory computer readable medium, wherein said construct interweaves a set of three Hues at a constant level of Saturation and an increasing level of Luminance for a predetermined number of cycles until each segment in said Intensity Based Colormap has been set;

means for Automatically rendering an infrared image using said Intensity Based Colormap; and means for Automatically outputting an intensity-based image created by using said Intensity Based Colormap.

11. A computer system for converting images using an Intensity Based Colormap as claimed in claim 10 wherein said predetermined number of cycles is 128.

12. A computer system for converting images using an Intensity Based Colormap as claimed in claim 10 wherein said system receives said predetermined number of cycles from a user.

13. A computer system for converting images using an Intensity Based Colormap as claimed in claim 12 wherein said system uses a set of three Hues comprising a red value, an orange value, and a yellow value for rendering said infrared image when said infrared image is a desert image.

14. A computer system for converting images using an Intensity Based Colormap as claimed in claim 12 wherein said system receives a number of cycles, a number of Hues, and a degree of separation between said number of Hues from a user.

15. A computer readable medium encoded with computer-readable instructions for execution by a Computer Machine to convert an image file using an Intensity Based Colormap that, when executed, cause the Computer Machine to:

receive an image;

configure an Intensity Based Colormap with interwoven Colors;

mapping a set of image data received from an infrared camera to a grayscale palette and then converting a grayscale image to said Intensity Based Colormap; and output an intensity-based image on a Graphical User Interface.

16. A computer readable medium encoded with computer-readable instructions for execution by a Computer Machine to convert an image file using an Intensity Based Colormap as claimed in claim 15 wherein said step of configuring an Intensity Based Colormap with interwoven Colors further comprises:

setting a first Hue to 100 on an RGB scale;

setting a second Hue to 120 on an RGB scale;

setting a third Hue to 140 on an RGB scale;

setting a Saturation level to a constant value;

setting a Luminance level to zero;

calculating a first, second, and third Color using said first, second and third Hues respectively with said Saturation level and said Luminance level;

placing each of said first, second and third Colors on said Colormap;

increasing a Luminance level for every three Colors placed on said Colormap; and repeating said calculating/placing/increasing steps until said Luminance level results in a white value.

17. A computer readable medium encoded with computer-readable instructions for execution by a Computer Machine to convert an image file using an Intensity Based Colormap as claimed in claim 15 wherein said step of configuring an Intensity Based Colormap with interwoven Colors further comprises creating a Colormap ranging from black and white comprising multiple cycles of three Hues with constant Saturation and steadily increasing Luminance.

* * * * *